United States Patent [19]

Peletz

[11] E Patent Number: Re. 32,233

[45] Reissued Date of Patent: Aug. 26, 1986

[54] PRECAST CONCRETE CATCH BASIN WITH FORM FOR GUTTER INLET

[75] Inventor: Harold Peletz, Santa Rosa, Calif.

[73] Assignee: Santa Rosa Cast Products Co., Santa Rosa, Calif.

[21] Appl. No.: 744,429

[22] Filed: Jun. 13, 1985

Related U.S. Patent Documents

Reissue of:

[64] Patent No.: 4,192,625
Issued: Mar. 11, 1980
Appl. No.: 942,998
Filed: Sep. 18, 1978

[51] Int. Cl.[4] ..... E01C 11/22

[52] U.S. Cl. ..... 404/5; 404/25

[58] Field of Search ..... 404/2, 4, 5, 25, 6, 404/7; 210/163, 164; 52/20

[56] References Cited

U.S. PATENT DOCUMENTS

| | | | |
|---|---|---|---|
| 125,118 | 4/1872 | Chase et al. | 404/5 |
| 389,391 | 9/1888 | Landis | 404/2 |
| 760,841 | 5/1904 | Bedell | 404/4 |
| 881,003 | 3/1908 | Kennelly | 404/4 |
| 993,244 | 5/1911 | Hansbrough | 404/7 X |
| 1,978,491 | 10/1934 | Gladman | 404/2 |
| 2,537,654 | 1/1951 | Curnutte | 404/4 |
| 3,250,189 | 5/1966 | Peletz | 404/5 |
| 3,945,746 | 3/1976 | Bredbenner | 404/4 |

FOREIGN PATENT DOCUMENTS

| | | | |
|---|---|---|---|
| 531959 | 1/1941 | United Kingdom | 404/5 |

*Primary Examiner*—James A. Leppink
*Assistant Examiner*—John F. Letchford
*Attorney, Agent, or Firm*—Ernest M. Anderson

[57] ABSTRACT

A precast concrete catch basin is provided with an integral transverse gutter inlet shaping form across the front. The form is spaced from the top slab of the catch basin and forms therewith a gutter inlet for the passage of water into the catch basin. The transverse form is arcuate in shape and serves as a form and top surface for a concrete gutter inlet cast against it. Anchor bolts are provided in the side walls of the catch basin and extend outwardly through the transverse form into the area of the concrete gutter so as to secure the inlet shaping form to the side walls and to anchor the catch basin to the gutter after the gutter has been cast in the field against the transverse gutter shaping form.

5 Claims, 2 Drawing Figures

PRECAST CONCRETE CATCH BASIN WITH FORM FOR GUTTER INLET

Matter enclosed in heavy brackets [ ] appears in the original patent but forms no part of this reissue specification; matter printed in italics indicates the additions made by reissue.

SUMMARY OF THE INVENTION

The invention relates to precast concrete catch basins such as that disclosed in my U.S. Pat. No. 3,250,189 which issued May 10, 1966. Such precast, reinforced concrete structures are normally installed along the curb of a highway or street on top of a concrete well which communicates with a storm sewer or other means for carrying away surface drainage. After the catch basin has been installed in place, it is customary to cast a continuous concrete curb having a raised face which abuts the sides of the catch basin and a base or gutter portion which passes across the front of the catch basin. The gutter, in conjunction with the side walls and the top slab of the catch basin, defines an inlet for the passage of water into the well of the catch basin. Heretofore, it has been necessary to form the base or gutter portion and, more particularly, that portion of the gutter which forms the throat of the opening to the catch basin, by hand after the catch basin has been installed. This has proven to be unsatisfactory since the space to work in is quite confined making it difficult to hand shape a smooth surface for the passage of drain water.

The present invention has for its object an improved precast concrete catch basin wherein the catch basin is provided with an integral transverse form which serves to form a smooth shape to the base or gutter portion of the curb and, particularly, to that portion of the gutter forming the throat of the inlet to the catch basin.

Figure 1:
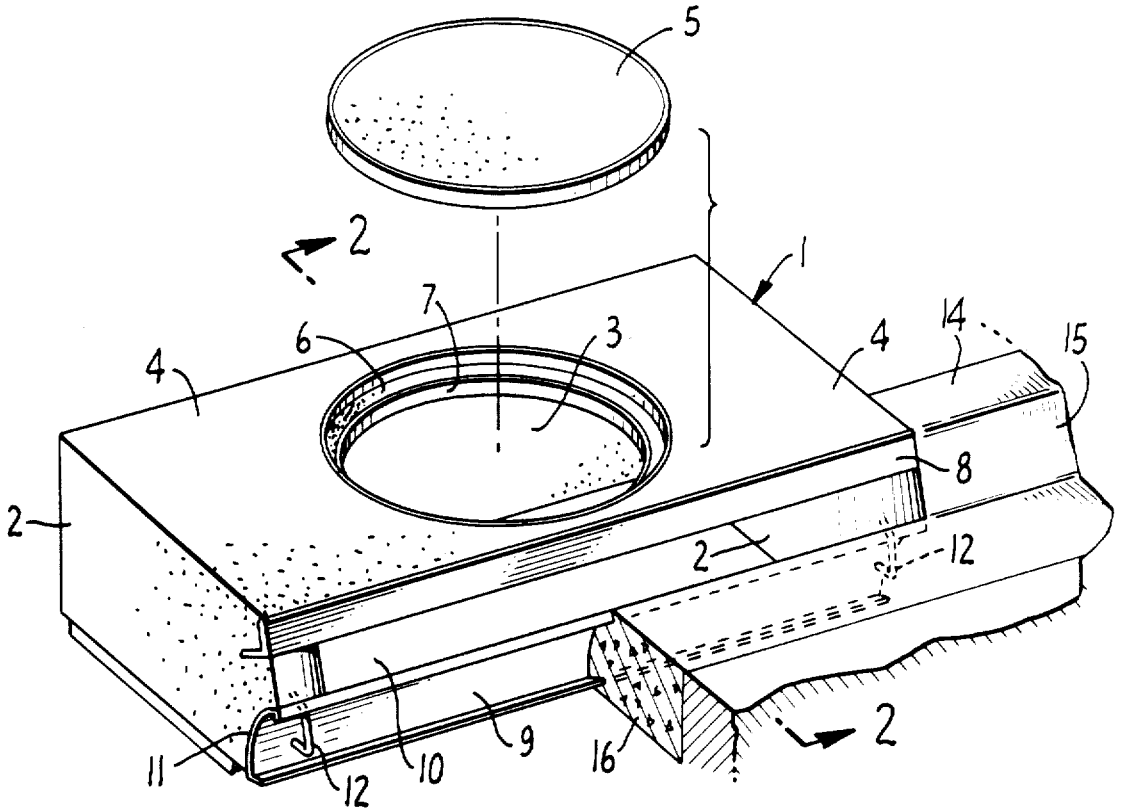
Figure 2:
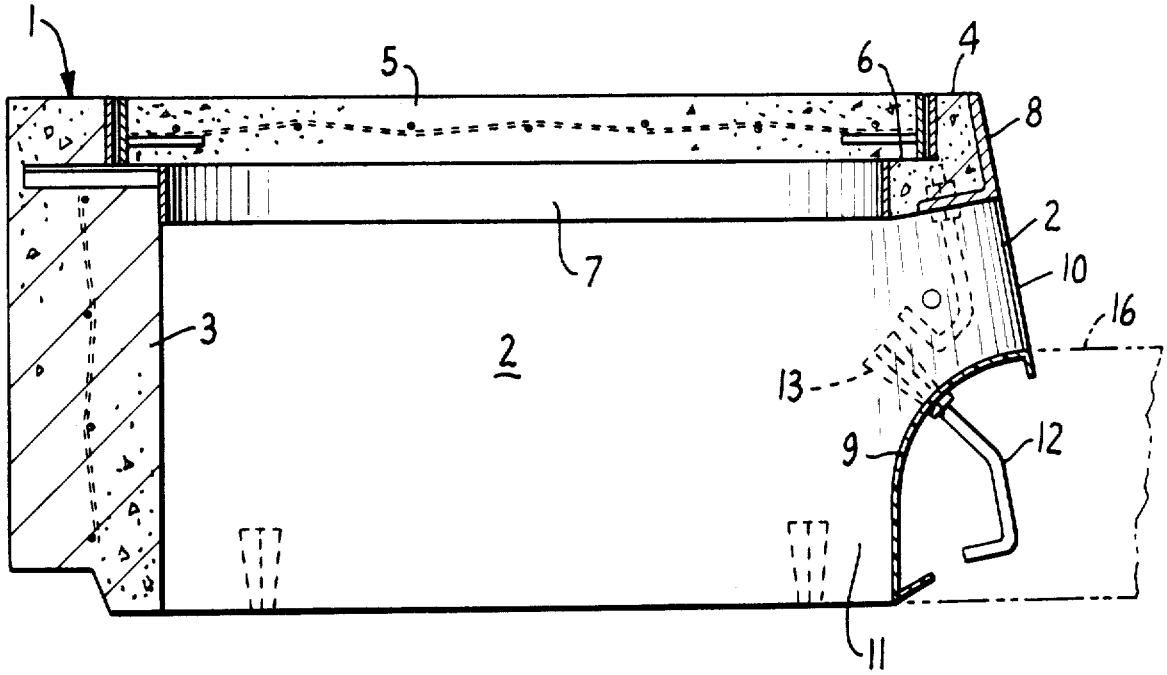

Of the drawings:

FIG. 1 is a perspective view of an improved precast concrete catch basin incorporating the present invention; and FIG. 2 is a transverse sectional view of the catch basin taken along the line 2—2 in FIG. 1 looking in direction of the arrows.

Referring first to FIG. 1, there is shown the top cover section 1 of a precast concrete catch basin. The cover section 1 of the catch basin is adapted to be set upon a concrete well section (not shown) which communicates with storm sewer pipes that carry off surface drainage water collected in the well. The catch basin 1 is of the type customarily installed along the curb of a highway or street.

The catch basin comprises a monolithic structure of reinforced concrete having a pair of vertical, parallel side walls 2,2, a rear wall 3 connecting the side walls and a top slab 4 also connecting the side walls, all integrally cast. The top slab 4 of the catch basin is provided with a manhole cover 5 that rests upon an annular supporting surface 6 formed at the outer periphery of the opening 7 of the manhole through which access to the well section of the catch basin is obtained. The front surface of the top slab is provided with a nosing 8 formed by an angle iron which extends transversely across the front of the catch basin. The catch basin is also provided with an integral transverse gutter inlet shaping form 9 that extends across the front of the side walls 2,2 and is spaced from the nosing 8 on the top slab so as to define therewith an inlet 10 to accommodate the passage of water into the well of the catch basin. The transverse form 9 serves as a concrete form during the casting of the gutter and curb in the field. It is left in place after the gutter has been cast and then serves as the top surface of the gutter inlet as is more particularly described hereafter. The transverse form may be made from any suitable material that is strong enough to provide the rigidity required to withstand the pressure of the cast concrete. In preferred form, the transverse form is made from fiberglass but it could also be made from metal or any other suitable material. In the preferred embodiment, the transverse form 9 has a smooth arcuate shape in cross-section. Because of its arcuate shape, the form provides a smooth path for water as it drains into the well of the catch basin.

The front surfaces 11,11 of the side walls 2,2 are formed with a configuration corresponding to the arcuate shape of the transverse form 9 and the form is held in position against these front surfaces by means of anchor bolts 12,12. The anchor bolts thread into suitable plastic receptacles 13,13 placed in the side walls at the time the walls are cast.

Installation of the top cover section of the catch basin 1 on the well section (not shown) is made in the field. With the catch basin in place at the side of the road a continuous curbing is cast. The curb 14 has a raised face 15 which abuts the side walls 2,2 of the catch basin. The curb 14 also has a base or gutter portion 16 which passes across the front of the catch basin. This gutter is cast in the field against the transverse form 9. Unlike customary forms, the form 9 is not removed after the gutter has hardened but remains in place to form a smooth surface for the passage of water. Because of this, the throat portion of the gutter inlet no longer need be formed by hand.

I claim:

1. In a catch basin assembly for collecting surface drainage from a street gutter wherein said catch basin has a pair of vertical substantially parallel side walls, a rear wall connecting the side walls and a top slab also connecting said side walls, the improvement comprising:

an integral transverse form [attach] *attached* to and extending across the front of said side walls and spaced from said top slab to define therewith an inlet opening to accommodate the passage of water into said catch basin, said transverse form being adapted to form, and remain in place as a water conducting surface for, a cast concrete gutter.

2. The improved catch basin assembly as set forth in claim 1 wherein said transverse form has a smooth arcuate shape *in cross-section.*

3. The improved catch basin assembly as set forth in claim 2 wherein said side walls are provided with anchor means extending outwardly of said side walls and through said transverse form to secure it *and the cast concrete gutter which it forms* to said side walls.

*4. The improved catch basin assembly of claim 1 or 2, said form having at least one flange extending along one edge thereof, said flange projecting angularly inward from an arcuate concave surface, whereby said flange is embedded within the concrete gutter which is formed.*

*5. The improved catch basin assembly of claim 1 or 2, said form having a pair of upper and lower flanges extending along its upper and lower edges respectively, the upper flange projecting downward, the lower flange projecting inward, whereby said flanges are embedded within the concrete gutter which is formed.*

* * * * *